US006775894B2

(12) United States Patent
Hardin

(10) Patent No.: US 6,775,894 B2
(45) Date of Patent: Aug. 17, 2004

(54) CASING PATCHING TOOL

(75) Inventor: James Hardin, Bakersfield, CA (US)

(73) Assignee: Aera Energy, LLC, Bakersfield, CA (US)

( * ) Notice: Subject to any disclaimer, the term of this patent is extended or adjusted under 35 U.S.C. 154(b) by 17 days.

(21) Appl. No.: 09/903,058

(22) Filed: Jul. 11, 2001

(65) Prior Publication Data

US 2003/0015246 A1 Jan. 23, 2003

(51) Int. Cl.[7] .................................................. B23P 6/00
(52) U.S. Cl. ...................... 29/402.09; 29/235; 29/451; 138/97; 138/98; 166/208; 166/277
(58) Field of Search ..................... 29/402.01, 402.02, 29/402.09, 407.09, 450, 451, 235; 138/97, 98; 166/206, 207, 208, 211, 277; 285/15, 23

(56) References Cited

U.S. PATENT DOCUMENTS

| 341,327 A | * | 5/1886 | Fay ............................ 166/207 |
| 649,415 A | * | 5/1900 | Shafer ........................ 428/63 |
| 1,380,182 A | * | 5/1921 | Bigelow ...................... 166/207 |
| 2,160,804 A | * | 5/1939 | Hall et al. ................... 166/277 |
| 3,167,122 A | | 1/1965 | Lang ............................ 166/14 |
| 3,349,852 A | * | 10/1967 | Peters ......................... 166/113 |
| 4,109,684 A | | 8/1978 | Fernandez ................... 138/97 |
| 4,190,942 A | * | 3/1980 | Tucker ........................ 29/451 |
| 4,368,571 A | | 1/1983 | Cooper, Jr. .................. 29/421 |
| 4,501,327 A | * | 2/1985 | Retz ............................ 166/285 |
| 4,581,801 A | | 4/1986 | Kobuck et al. ............. 29/157.4 |
| 4,589,447 A | | 5/1986 | Kane et al. .................. 138/98 |
| 4,647,072 A | | 3/1987 | Westman ..................... 285/15 |
| 4,713,870 A | | 12/1987 | Szalvay ..................... 29/402.09 |
| 4,793,382 A | | 12/1988 | Szalvay ....................... 138/98 |
| 4,865,127 A | * | 9/1989 | Koster ........................ 166/277 |
| 4,913,758 A | * | 4/1990 | Koster ........................ 156/191 |
| 5,040,283 A | | 8/1991 | Pelgrom ...................... 29/447 |
| 5,042,532 A | | 8/1991 | Gilleland ..................... 138/98 |
| 5,056,210 A | * | 10/1991 | King, Jr. ...................... 29/523 |
| 5,119,862 A | | 6/1992 | Maimets et al. ............. 138/98 |
| 5,186,215 A | | 2/1993 | Gilleland ..................... 138/98 |
| 5,209,600 A | * | 5/1993 | Koster ........................ 403/344 |
| 5,263,515 A | | 11/1993 | Goodale ...................... 138/98 |
| 5,368,075 A | * | 11/1994 | Baro et al. ................... 138/98 |
| 5,507,343 A | * | 4/1996 | Carlton et al. .............. 166/277 |
| 5,613,557 A | * | 3/1997 | Blount et al. ............... 166/277 |
| 5,638,592 A | * | 6/1997 | O'Toole et al. ............ 29/469.5 |
| 5,725,026 A | * | 3/1998 | Maimets ..................... 138/97 |
| 5,785,120 A | * | 7/1998 | Smalley et al. .............. 166/55 |
| 5,794,702 A | * | 8/1998 | Nobileau .................... 166/380 |
| 5,833,001 A | * | 11/1998 | Song et al. .................. 166/287 |
| 5,881,420 A | * | 3/1999 | Bruckelmyer .......... 15/104.066 |

(List continued on next page.)

FOREIGN PATENT DOCUMENTS

JP 02001020653 A * 1/2001

*Primary Examiner*—Essama Omgba
(74) *Attorney, Agent, or Firm*—Hogan & Hartson, LLP

(57) ABSTRACT

An apparatus for sealing perforations, holes, cracks or the like in a tube or pipe and particularly in an oil well casing. The apparatus including a delivery tool for delivery of a coiled patch composed of spring-like material to the location of a damaged portion within a pipe. The patch consisting of a flat sheet of spring-like material where the length and width of the patch are comparatively large with respect to the thickness of the patch. The delivery tool comprising a hydraulicly activated plunger assembly and barrel. Prior to use, the patch is wound into the form of a coiled cylinder by means of a rolling tool and is loaded into the barrel of the delivery tool. To deploy the patch, hydraulic pressure is applied to the plunger assembly causing the plunger to move downwardly within the barrel and push the patch out of the barrel. Upon deployment, the patch unwinds within the pipe or tube and seals the damaged area against the infiltration or exfiltration of fluids or gasses.

19 Claims, 2 Drawing Sheets

U.S. PATENT DOCUMENTS

| | | | | |
|---|---|---|---|---|
| 5,894,863 A | * | 4/1999 | Lewis et al. | 138/93 |
| 6,019,136 A | * | 2/2000 | Walsh et al. | 138/98 |
| 6,142,230 A | * | 11/2000 | Smalley et al. | 166/277 |
| 6,250,385 B1 | * | 6/2001 | Montaron | 166/207 |
| 6,283,211 B1 | * | 9/2001 | Vloedman | 166/277 |
| 6,516,506 B2 | * | 2/2003 | Donnelly et al. | 29/451 |
| 2002/0179306 A1 | * | 12/2002 | Johnson et al. | 166/380 |
| 2003/0183397 A1 | * | 10/2003 | Hoffman | 166/384 |
| 2004/0016539 A1 | * | 1/2004 | Richard | 166/207 |

* cited by examiner

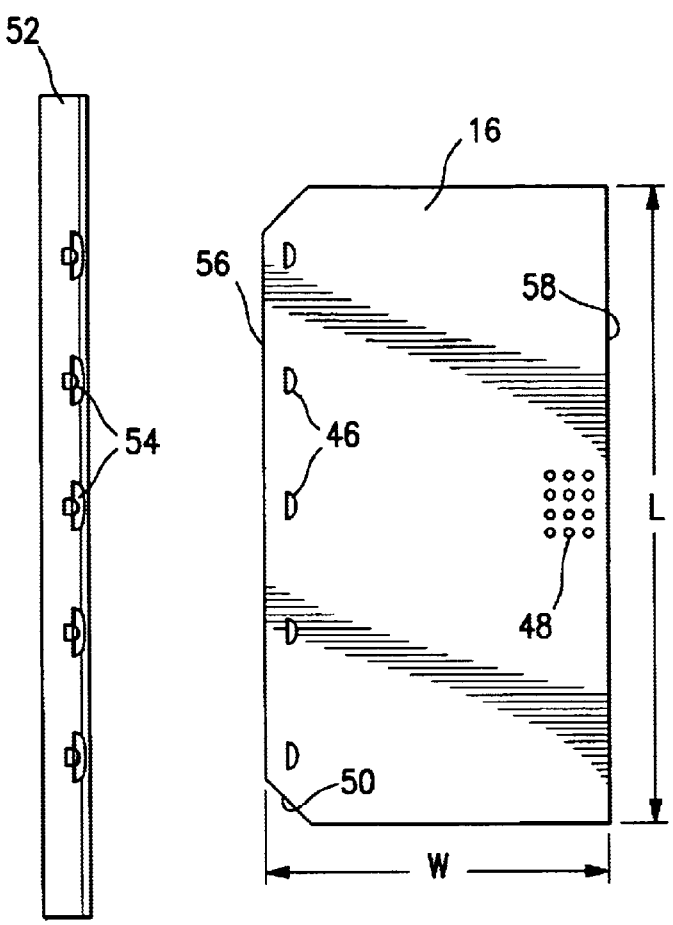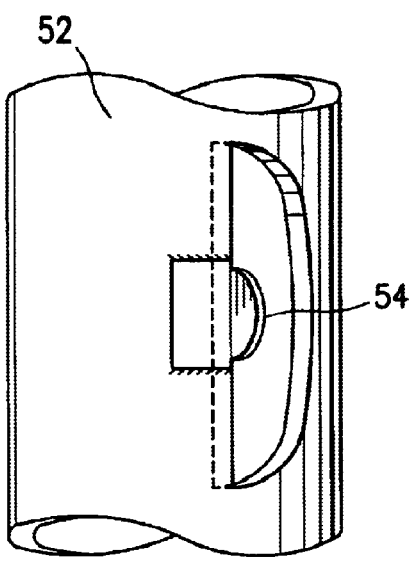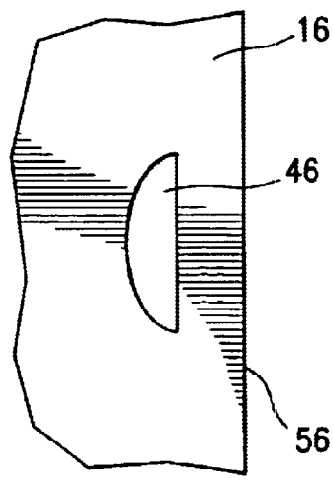

CASING PATCHING TOOL

BACKGROUND OF THE INVENTION

The present invention relates to the installation of patches to seal holes in pipes generally, and more particularly to a method and apparatus for sealing perforations in steam or water injection oil wells.

Oil wells may be generally classified as being of one of three different types; production wells, steam injection wells, and water injections wells. Production wells are used to pump oil from an oil bearing formation. Steam injection wells serve to heat certain types of particularly thick oil and thereby aid production wells in extracting oil. Water injection wells operate on the principle that oil floats on water and therefore oil extraction may be aided by pumping water below an oil pool and thereby raising the level of the pool. Oil wells are typically made by drilling a borehole in an oil bearing formation. The borehole is typically about six to twenty inches in diameter and may range from about 400 to about 20,000 feet in depth. After drilling the borehole to a desired depth, a steel pipe or casing is installed in the borehole from the surface to the bottom of the hole. Such casings vary in diameter depending upon the application. Casings of three and one-half inches in outside diameter are one common size for steam injection wells. After installation of the pipe, cement is typically pumped down the pipe under substantial pressure so that the cement will exit the pipe at the bottom of the borehole and will flow to the surface, thereby filling the gap between the outside of the pipe and earthen inner wall of the borehole. Upon completion of the process an open pipe encased in cement runs from the surface to the bottom of the original earthen borehole.

In many oil bearing formations, the oil is very thick having a consistency similar to that of molasses. Oil of this type cannot effectively be pumped to the surface without first heating the oil to reduce its viscosity to a point where the oil is in a flowable state. It has long been standard practice in the oil industry to heat such thick oil by means of steam injection. In a steam injection oil well, perforations, for the injection of steam into the oil are created at predetermined intervals along that portion of the well casing that passes through the oil bearing formation. For example, if the last two hundred feet of an 1800 foot wellbore pass through an oil pool, four perforations will typically be made at 50 foot intervals along the casing. Typically, the perforations are about one quarter of an inch in diameter and are formed by "shaped" explosive charges which are lowered to the desired depths in the well. The shaped charges are capable of penetrating both the inner steel well casing and the outer concrete casing.

A common problem in steam injection oil wells is that as the oil is pumped from the well, the oil level drops and eventually uncovers the perforations. When this occurs steam enters the evacuated region formerly occupied by oil and forms what is known in the industry as a "steam chest." The loss of steam through uncovered perforations greatly reduces the efficiency of the well and in many cases where multiple perforations are uncovered the recovery of the remaining oil reachable by the well becomes cost prohibitive. In order to keep such wells productive, attempts have been made to develop methods of sealing the uncovered perforations. Perhaps the most common prior art approach to sealing perforations has been to form a sealing sleeve, where the sleeve comprises a cylindrical steel portion with rubber-like gasket material bonded to the outer surface of the steel sleeve. The sleeve and gasket typically have a combined thickness of about 0.5 inch. Thus, when deployed the sleeve creates a significant restriction in the diameter of a typical wellbore. Generally, for deployment, the sleeve is wrapped about an expansion device which is typically a mechanically operated expander plug and is subsequently lowered to the uncovered perforation. Upon reaching the perforation the sleeve is expanded to seal the perforation. Typically, the sleeve is held in place in the well casing by friction. Devices similar to the one described above except that an explosive charge is substituted for the expander plug have also been tried.

The prior art approaches suffer from several drawbacks, with the foremost being the reduction in the inside diameter of the wellbore in the region of the sealing sleeve. Such a reduction in diameter severely limits the types of downhole tools that may subsequently be deployed in the bore. In addition, since prior art sealing sleeves are wrapped about an expansion device, there is typically only a small amount of clearance between the outside diameter of the sealing sleeve and the inside diameter of the wellbore. As a consequence, any irregularity in the casing due to deposits or a slight bend in the casing will cause a typical prior art sealing patch to "hang up" or become wedged in the wellbore. Also, prior art sealing sleeves have been known to leak severely and, on rare occasions, slip in the bore and consequently uncover the perforation they were intended to seal. Further, the prior art sealing methods have proven to be relatively costly to employ.

What is needed therefore is a sealing device and method that can effectively seal a casing perforation with a relatively thin patch that does not significantly reduce the size of the borehole. Another highly desirable feature would be the ability to place a subsequent patch at a location below an existing patch. Preferably, such a device and method will also provide a mechanism for more securely adhering the patch to the wall of the wellbore, and will further be of relatively low cost to produce and deploy.

SUMMARY OF THE INVENTION

The present invention casing patching tool overcomes many of the problems of the prior art by providing an apparatus and method for delivering a thin spirally wound or coiled patch possessing spring-like properties that effectively seals wellbore perforations without significantly reducing the bore's internal diameter. The patch is preferably formed from spring-steel and uses spring tension to increase adherence to the wall of the wellbore. The invention provides the ability to place a subsequent patch at a location below an existing patch. Consequently each perforation in a steam injection well may be sealed as the level of oil in the formation drops and thereby exposes the next lower perforation. Further, the present invention casing patching tool may be fabricated at relatively low cost and is comparatively easy to deploy and use.

The primary components of the invention preferably comprise a spirally wound metal patch, a patch delivery tool, and a patch rolling tool. The delivery tool further comprises a barrel and a plunger assembly, where the plunger assembly is slidably received within the barrel. Prior to use, the patch is wound into the form of a cylinder by means of the rolling tool and is loaded into the barrel of the delivery tool. To prevent inadvertent deployment of the patch while lowering the delivery tool to the location of a perforation, a shear pin is used to hold the plunger assembly in a fixed position with respect to the barrel. To deploy the patch, hydraulic pressure is applied to the plunger assembly causing the barrel to shear the shear pin and move upwardly with respect to the stationary plunger. The patch abuts the plunger and remains stationary while the barrel travels up the pull tube. At the end of its travel, the barrel will have slid entirely off the patch, thus freeing the patch within the wellbore. Upon deployment, the patch unwinds within the wellbore and seals the perforation in the casing wall. Spring tension tends to keep the patch securely fixed over the perforation. These and other features of the invention will become more apparent from the following detailed description of the invention, when taken in conjunction with the accompanying exemplary drawings.

BRIEF DESCRIPTION OF THE DRAWINGS

FIG. 4 is a top plan view of a sealing patch in accordance with the present invention.

FIG. 5 is a top plan view of a patch rolling tool in accordance with the present invention.

FIG. 6 is a side view, reduced in scale, of the patch of FIG. 4, after it has been rolled with the rolling tool of FIG. 5.

FIG. 7 is top view, reduced in scale, showing the spirally wound or coiled configuration of the patch of FIG. 4, after it has been rolled with the rolling tool of FIG. 5.

FIG. 8 is a detail view showing an exemplary D-shaped slot and clip for use in the rolling tool of FIG. 5.

FIG. 9 is a detail view showing an exemplary D-shaped slot for use in the patch of FIG. 4.

DETAILED DESCRIPTION OF THE INVENTION

Figure 1:
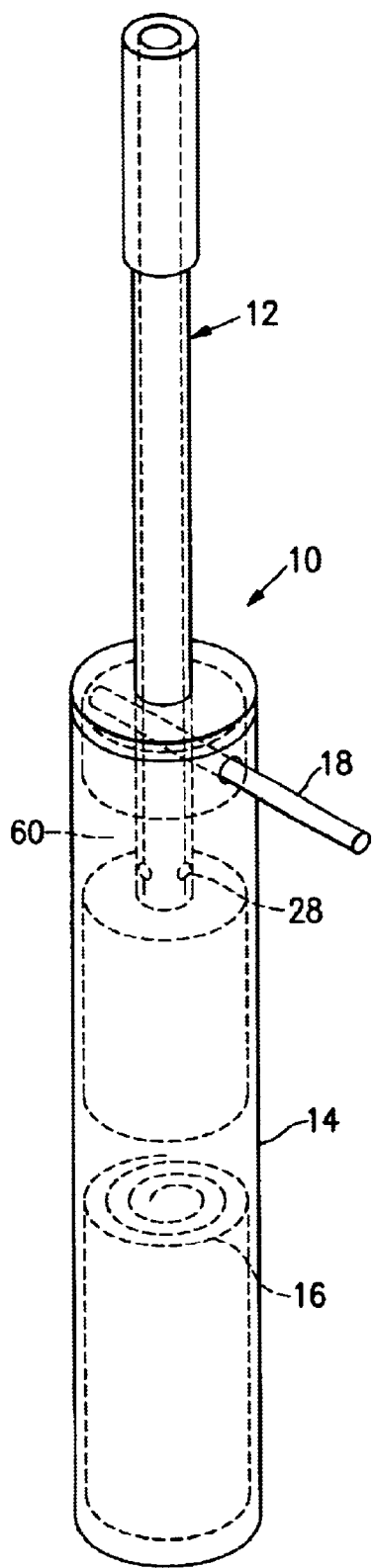
FIG. 1 is a perspective view of the assembled delivery tool showing the relationship between the barrel and plunger assembly and further showing a patch loaded within the barrel in accordance with the present invention.

Referring to FIG. 1, an exemplary embodiment of the casing patching tool 10 is shown. The tool comprises a plunger assembly 12 and a plunger barrel 14. Also shown is a shear pin 18 which locks the plunger assembly to the barrel while the delivery tool is deployed to the location of a perforation. Deployment is typically accomplished by lowering the delivery tool via a cable to a predetermined depth within a borehole. Also shown is a metal patch 16, which has been rolled or coiled and loaded into the plunger barrel.

Figure 2:
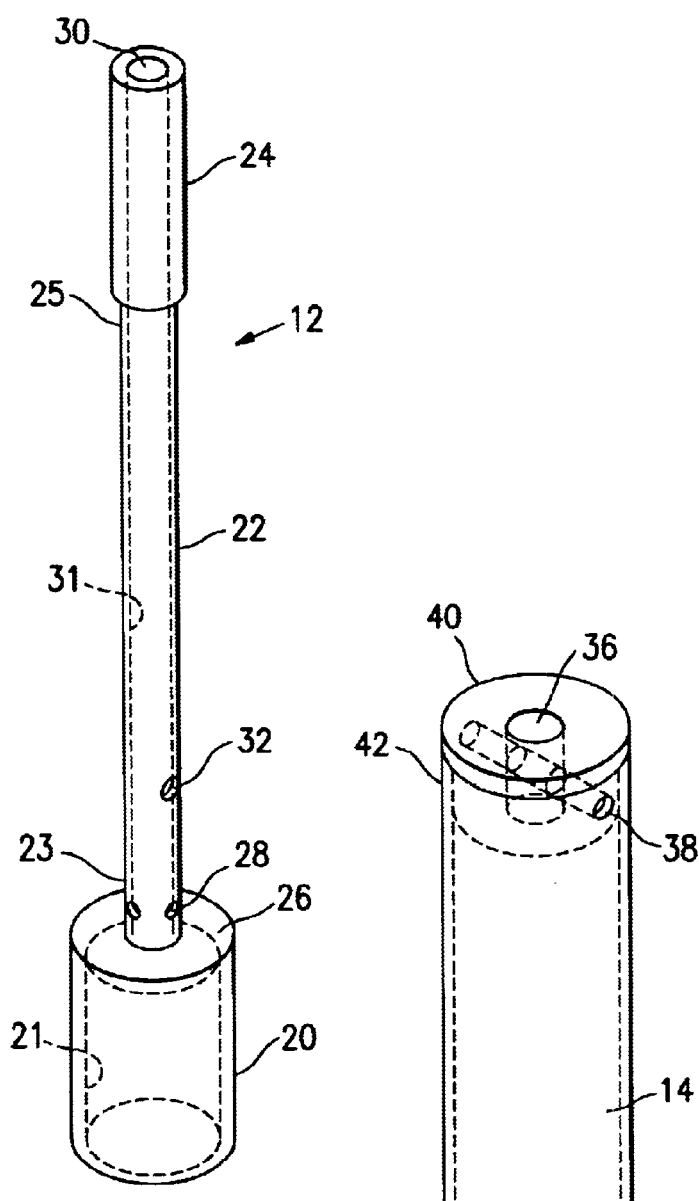
FIG. 2 is a perspective view of the plunger assembly shown in FIG. 1.
Figure 3:
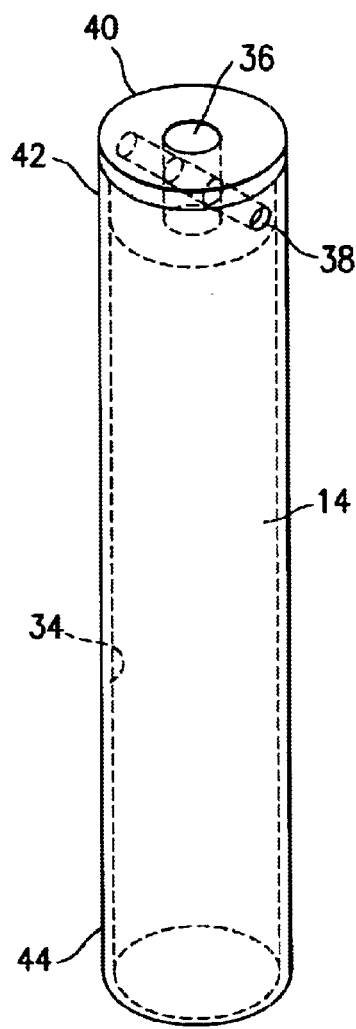
FIG. 3 is a perspective view of the barrel assembly shown in FIG. 1.

Referring now to FIGS. 2 and 3, the plunger assembly 12 and the barrel 14 are shown in more detail. The plunger assembly includes a plunger 20, a pull-tube 22, and a hydraulic fitting 24. The plunger is preferably cylindrical in configuration and may have a bore 21 or may be solid. The plunger is sized to be slidably received within a first bore 34 of the barrel 14. Connected to the plunger is the pull-tube having upper and lower ends 25 and 23 respectively. The pull-tube is a hollow tube having a bore 31 through which pressurized fluid may pass. At its lower end, the pull-tube includes a plurality of holes 28 through which the pressurized fluid may exit. Also formed in the lower end of the pull-tube is a keyway or hole 32 for receipt of the shear pin 18. The pull-tube is sized to be slidably received within a second bore 36 of the barrel. The lower end of the pull-tube is attached to the plunger substantially along a common longitudinal axis. The lower end may be attached to the plunger by any known method including welding or threading the lower end to a top surface 26 of the plunger. It is important to note that the pull-tube is not in fluid communication with the interior bore 21 of the plunger, when the plunger is so equipped. The upper end of the pull-tube is connected to a hydraulic fitting 24, and the bore 31 of the pull-tube is in fluid communication with a bore 30 of the hydraulic fitting. The upper end of the pull tube may be connected to the hydraulic fitting by any suitable means including welding or threading. The pull-tube and the hydraulic fitting may also be formed integrally, i.e., they may be integrally machined from a single piece of metal bar or tube stock. It is also possible, and may in some situations be desirable to integrally form the pull-tube with the plunger.

With particular reference to FIG. 3, the plunger barrel 14 is an elongated hollow cylindrical member having upper and lower ends, 42 and 44 respectively, and the longitudinal first bore 34. The upper end of barrel is closed out by a top plate or barrel plug 40, which includes the second bore 36 for slidable receipt of the pull-tube 22. The barrel also includes a hole 38 for receipt of the shear pin 18. The lower end of the barrel is open to allow the plunger 20 and the pull-tube to be inserted into the barrel and is of sufficient length to house the metal patch 16. Preferably, the barrel is constructed of steel and the first bore 34 is hard chrome plated. The hard chrome plating both reduces friction within the barrel and resists corrosion. Generally, the components of the delivery tool should be constructed of steel or other materials capable of withstanding the environmental conditions typically found in a deep oil well. The borehole environment includes pressures in the range of about 100–1000 psi and temperatures of about 200–500° F. Some boreholes also contain corrosive gasses with hydrogen sulfide and carbon dioxide being the most common. Borehole conditions tend to vary from oil field to oil field, however, these environments are well understood by those skilled in the art and materials suitable for use in such environments are also well known.

Referring now to FIGS. 4–5 and 8–9, the metal patch 16 of the present invention comprises a flat sheet of length "1," width "w," and of thickness "t." Generally, the patch should be comparatively thin with respect to its length and width in order to keep the reduction in the inside diameter of the wellbore to a minimum. The actual patch thickness is a function of the diameter of the wellbore and the yield and tensile strengths of the patch material. In general, as the wellbore diameter increases it is necessary to increase the thickness of the patch in order for the deployed patch to apply sufficient force to the wall of the wellbore to seal the perforation. In the exemplary embodiment, a patch of about 6 feet long, by about 3 feet wide, by about 0.008 inches thick was successfully used in a steam injection well having a casing with an outside diameter of about 3.5 inches. It is expected that patches having a thickness in the range of about 0.004 to about 0.030 inches will effectively seal typical steam injection wells, which range in size from about 2⅞ inches in diameter to about 7.0 inches in diameter.

Preferably, the width of the patch is sized to be about three times the circumference of the wellbore. This allows for about three wraps of the patch internally within the wellbore when the patch is deployed. Three wraps have been found sufficient to effectively seal a perforation, yet not significantly reduce the internal diameter of the wellbore. It is to be emphasized, that the dimensions given are exemplary only and are not meant to be limiting. The actual dimensions for a particular patch will vary depending on the size of the wellbore, the size of the perforation to be sealed, and the borehole environment.

The patch 16 includes an inside edge 56, which is engaged by a rolling tool 52, and an outside edge 58, the full length of which is in contact with the wall of the wellbore. The patch also includes a plurality of engagement slots 46, of predetermined spacing, which run along the length of the inside edge. The slots are engaged by a like number of slotted clips 54, of like spacing, on the patch rolling tool 52. In the exemplary embodiment, the slots and engaging clips are generally D-shaped in configuration. However, many other slot and clip arrangements are known and are suitable in this application.

Along the outside edge 58 of the patch 16, an optional pattern of holes 48 which may increase the frictional adherence of the patch against the wall of the well casing, may be added. The pattern of holes may run the entire length of the outside edge or may cover only a portion thereof. The function of the holes is to improve the sealing characteristics of the patch and it is presently believed that this goal is best met by placing a pattern of holes over only a portion of the outside edge. The size and spacing of the holes may vary depending upon the application. Further, additional testing may reveal that configurations other than circular holes provide for better adherence of the patch to the wall of the wellbore. Thus, it may prove desirable to make the holes square, triangular, or of some other pattern. In the exemplary embodiment, twelve holes of about one inch in diameter spaced apart about two inches from hole centerline to centerline were included at the midpoint of the outside edge of the patch. The inside edge 56 of the patch may also be optionally equipped with chamfers 50. The chamfers provide for deflection points which reduce the likelihood of the inside edge of the patch from deflecting or curling inwardly when deployed within a wellbore. Such inward deflection or curling is undesirable because it increases the likelihood of a downhole tool becoming caught or snagged on the patch.

Preferably the metal patch is constructed of spring-steel. Type 301 stainless steel in the full-hard condition is one suitable alloy that provides a desirable combination of spring-like properties and corrosion resistence. However, numerous other steel alloys and materials with spring-like properties are known in the art and may be substituted for spring-steel. Other potentially suitable materials include various plastics and carbon fiber composites and other structural composites. Also, a non-metal coating may be added to the surface of stainless steel patches to reduce the likelihood of galvanic corrosion occurring between the stainless steel patch and the mild steel casing.

Referring now to FIG. 5, the patch rolling tool 52 may be formed from virtually any material in which clips 54 may be formed or attached. Suitable materials include steel, aluminum, or plastic bar, plate, or tube stock. Other materials are also suitable.

The apparatus of the present invention may be used as follows. Referring now to FIGS. 1–3, typically, the pull-tube 22 is attached to the plunger 20. Next the pull-tube is slid through the second bore 36 in the top plate or barrel plug 40. Next, the hydraulic fitting 24 is attached to the pull-tube. Subsequently, the plunger 20 is slid into the first bore 34 of the barrel 14 and the barrel plug is attached to the barrel thereby completing the delivery tool 10. In the exemplary embodiment, threaded connections were used to attach each component of the delivery tool.

Referring now to FIGS. 4–7, the slots 46 of the spring-steel patch 16 are engaged by the clips 54 of the rolling tool 52. The patch is then rolled along its width to form a coiled or spirally wound cylinder as shown in FIGS. 6 and 7. The patch may be secured in its coiled state via a patch restraining means, i.e., cords, bands, and the like to help load the patch in the barrel.

At this time, the shear pin holes 32 and 38, in the pull-tube 22 and barrel 14 respectively, are aligned and the shear pin 18 is inserted into the holes to fix the respective position of the pull-tube to the barrel. It should be noted that alignment of the pull-tube with the barrel defines an enclosed volume 60 between the top surface 26 of the plunger 20 and the top plate 40 of the barrel. Preferably, the holes 28 in the pull-tube will be located below the top plate and above the top surface of the plunger. Subsequently, the coiled patch 16 is loaded into position within the barrel. Preferably, the patch should be fully enclosed within the barrel and positioned adjacent to the plunger. As the patch is loaded into the barrel, the patch restraining means are removed and the patch will tend to uncoil slightly within the barrel creating a frictional force which securely holds the patch in place. The delivery tool 10, loaded with a coiled patch, is now ready for delivery to the location of a perforation. It should be noted that often it may be easier to first load the patch into the barrel prior to sliding the plunger into the barrel and attaching the top plate.

The delivery tool 10 and patch 16 may be deployed within a borehole using conventional wireline or coiled tube equipment or other lowering means well known to those skilled in the art of oil production. In addition to the downhole lowering means, a hydraulic fluid supply means must be connected to the delivery tool. Once the delivery tool has been lowered to a level proximate to a perforation, the patch 16 may be deployed. To deploy the patch a pressurized gas or liquid is supplied to the delivery tool. Most hydraulic fluids and compressible gasses are suitable for operating the tool. Presently, when wireline equipment is used to lower the tool, gas is preferred. The gas may be supplied by a gas generator which burns solid propellents to create high pressure gas source. Alternatively, compressed air or an inert gas may be supplied from a source such as a storage cylinder or a compressor. Presently, when coiled tubing is used as the lowering means, water is the preferred hydraulic fluid as often it is readily available at well sites and presents fewer handling and contamination problems than other fluids.

Deployment is accomplished by supplying the high pressure fluid (liquid or gas) to the hydraulic fitting 24. The fluid traverses the bore 31 of the pull-tube 22 and exits the tube at the plurality of holes 28 at the lower end of the tube 23. The pressurized fluid fills the volume 60 defined by the top plate 40 of the barrel 14 and the top surface 26 of the plunger 20. As pressure builds up within the volume 60, the barrel is forced upwardly against the stationary plunger until the coiled metal patch 16 is free of the barrel. Upon deployment from the barrel the patch unwinds or uncoils within the borehole and seals the perforation in the casing wall. Since the length of the patch (about six feet in the exemplary embodiment) is substantially greater than the size of a typical perforation (about one quarter inch), and because the patch is formed from spring-steel which forces the patch against the wall of the well casing, an effective seal against the perforation is achieved. Due to the comparatively thin wall thickness of the patch (preferably on the order of about 0.008 inches for a 3.5 inch wellbore) only a minimal reduction in diameter of the well casing occurs. Therefore, most downhole tools may still be used in the patched well and a subsequent patch may be deployed farther down the well if desired.

It will be appreciated that an improved method for sealing perforations in oil well casings has been presented and that the new method may significantly extend the working life of steam injection oil wells by sealing unneeded perforations. It will also be appreciated that the present invention casing patching tool may be used in any situation where it is desirable to seal a hole or perforation in a tube or pipe. In the field of oil production, the prevention of water infiltration in wells due to holes or cracks at casing joints is one such additional application. Those skilled in the art will also understand that the invention may be scaled up, or down, in size and weight and used to seal leaks in pipes or tubes of virtually any size. In addition, because the delivery tool uses hydraulic force to deploy the patch, there is no need for the tool to be in a downwardly facing vertical position. The tool may function at any angle. Nor is a lowering cable required. In other applications, lightweight versions of the tool may deployed in tortuous piping having long horizontal traverses using an appropriately designed hydraulic hose. Other contemplated applications for the present invention include sealing leaks in water and sewage lines. While only the presently preferred embodiments have been described in detail, as will be apparent to those skilled in the art, modifications and improvements may be made to the system and method disclosed herein without departing from the scope of the invention. Accordingly, it is not intended that the invention be limited except by the appended claims.

What is claimed is:

1. An apparatus for repairing a pipe having a damaged section, the apparatus comprising:
    an elongated cylindrical barrel having an open lower end, a closed upper end and a first bore therebetween, the closed upper end including a second bore;
    a plunger assembly including a plunger slidably received in the first bore, the plunger assembly further including an elongated tube having a plurality of orifices in fluid communication with the interior of the tube at a lower end thereof, the lower end of the tube being connected to the plunger, the tube being slidably received in the second bore;
    a coiled patch having spring-like properties, the patch being loaded into the first bore via the open lower end of the barrel and being disposed proximate to the plunger; and
    wherein pressurized hydraulic fluid may be applied to an upper end of the elongated tube, the fluid exiting the orifices in the lower end, causing the barrel to move upwardly with respect to the plunger, thereby ejecting the patch from the barrel, wherein the patch uncoils against the wall of the pipe sealing the damaged portion thereof.

2. The apparatus for repairing a pipe of claim 1, wherein the elongated tube and plunger barrel include holes, wherein a shear pin may be inserted into the holes thereby holding the tube and barrel in position to prevent unintentional deployment of the patch, the shear pin being sized to shear upon the application of pressurized hydraulic fluid to the tube.

3. The apparatus for repairing a pipe of claim 1, wherein the hydraulic fluid is selected from the group consisting of water, compressed air, inert gas, and solid propellant produced gas.

4. The apparatus for repairing a pipe of claim 1, wherein the upper end of the elongated tube is adapted to receive a hydraulic fitting.

5. The apparatus for repairing a pipe of chim 1, wherein the patch is formed from spring-steel sheet stock and includes an inside edge and an outside edge, wherein the inside edge includes a plurality of spaced slots for engagement with a plurality of clips of like size and spacing formed on a rolling tool, wherein the patch is coiled via the rolling tool.

6. The apparatus for repairing a pipe of claim 5, wherein the spaced slots and clips are D-shaped in configuration.

7. The apparatus for repairing a pipe of claim 5, wherein the outside edge of the metal patch includes a plurality of holes of predetermined size and spacing, wherein the boles increase the ability of the patch to adhere to an inner wall of the damaged pipe.

8. The apparatus for repairing a pipe of claim 1, wherein the patch is formed of spring-steel sheet stock having a thickness within the range of about 0.004 to about 0.030 inches.

9. The apparatus for repairing a pipe of claim 1, wherein the patch is formed of Type 301 full hard stainless steel sheet stock having a thickness within the range of about 0.004 to about 0.030 inches.

10. An apparatus for repairing a pipe having a damaged section, the apparatus comprising:
    an elongated plunger barrel having an open lower end, a closed upper end and a first bore therebetween, the upper end being closed by an attached top plate, the top plate including a second bore;
    a plunger assembly, the plunger assembly including a plunger slidably received in the first bore of the barrel and having a top surface, the plunger assembly further including an elongated pull-tube having a plurality of orifices at a lower end thereof, the orifices being in fluid communication with the interior of the pull-tube, the pull-tuba being connected to the top surface of the plunger and being slidably received in the second bore of the top plate of the barrel, the pull-tube being spaced within the barrel in such a manner that an enclosed volume is defined between the top surface of the plunger and the top plate of the barrel;
    a coiled patch having spring-like properties, the patch being loaded into the open lower end of the barrel and being disposed proximate to the plunger; and
    wherein pressurized hydraulic fluid may be applied to an upper end of the elongated pull-tube, the fluid exiting the orifices in the lower end thereof, thereby filling the defined volume and causing the barrel to move upwardly with respect to the pull-tube and plunger thereby ejecting the patch from the barrel, wherein the patch uncoils against the wall of the pipe sealing the damaged portion thereof.

11. The apparatus for repairing a pipe of claim 10, wherein the pull-tube and plunger barrel include holes, wherein a shear pin may be inserted into the holes thereby holding the pull-tube and barrel in position to prevent unintentional deployment of the patch, the shear pin being sized to shear upon the application of hydraulic pressure to the pull-tube.

12. The apparatus for repairing a pipe of claim 10, wherein the hydraulic fluid is selected from the group consisting of water, compressed air, inert gas, and solid propellant produced gas.

13. The apparatus for repairing a pipe of claim 10, wherein the upper end of the pull-tube is adapted to receive a hydraulic fitting.

14. The apparatus for repairing a pipe of claim 10, wherein the patch is formed of spring-steel sheet stock having a thickness within the range of about 0.004 to about 0.030 inches.

15. The apparatus for repairing a pipe of claim 10, wherein the patch is formed of Type 301 full hard stainless steel sheet stock having a thickness within the range of about 0.004 to about 0.030 inches.

16. The apparatus for repairing a tube of claim 10, wherein the patch is formed from metal sheet stock and includes an inside edge and an outside edge, wherein the inside edge includes a plurality of spaced slots for engagement with a plurality of clips of like size and spacing formed on a rolling tool, wherein the patch is coiled via the rolling tool.

17. The apparatus for repairing a tube of claim 16, wherein the spaced slots and clips are D-shaped in configuration.

18. The apparatus for repairing a tube of claim 16, wherein the outside edge of the metal patch includes a plurality of holes of predetermined size and spacing, wherein the holes increase the ability of the patch to adhere to an inner wall of the damaged pipe.

19. A method for repairing an oil wellbore casing having a damaged section, the method comprising the steps of:

supplying a patch delivery tool, the delivery tool comprising a hydraulically activated plunger slidably received in a plunger barrel, the barrel having sufficient depth to receive a patch, wherein the patch is positioned proximate to and below the plunger; supplying a flat metal patch of predetermined shape and thickness, the metal patch including a plurality of spaced slots along one side for engagement with a rolling tool;

supplying a rolling tool with a plurality of clips engageable with the slots of the metal patch;

engaging the clips of the rolling tool with the slots of the metal patch and rolling the flat metal patch into a cylindrical configuration;

loading the metal patch in the barrel of the delivery tool;

deploying the loaded delivery tool over a wellbore to be patched;

connecting the delivery tool to a lowering cable and a source of pressurized hydraulic fluid;

lowering the delivery tool in the wellbore to a location proximate the damaged section of the well casing; and deploying the metal patch from the delivery tool by supplying pressurized hydraulic fluid to the hydraulically activated plunger, wherein the metal patch uncoils upon deployment and seals the damaged section of the well casing.

* * * * *